United States Patent [19]
Kobayashi et al.

[11] Patent Number: 5,367,020
[45] Date of Patent: Nov. 22, 1994

[54] THERMOPLASTIC RESIN COMPOSITION

[75] Inventors: Akira Kobayashi, Saitama Prefecture; Tetsuya Kawamura, Tokyo; Tatsuo Teraya, Saitama Prefecture; Eiji Kuchiki, Saitama Prefecture; Yuji Fujita, Saitama Prefecture, all of Japan

[73] Assignee: Tonen Corporation, Tokyo, Japan

[21] Appl. No.: 156,092

[22] Filed: Nov. 22, 1993

Related U.S. Application Data

[62] Division of Ser. No. 897,404, Jun. 12, 1992, abandoned.

[30] Foreign Application Priority Data

Jun. 12, 1991 [JP] Japan .................................. 3-166232
Jun. 13, 1991 [JP] Japan .................................. 3-167468
Jun. 19, 1991 [JP] Japan .................................. 3-173288
Jun. 28, 1991 [JP] Japan .................................. 3-183934

[51] Int. Cl.$^5$ ....................... C08L 77/00; C08L 51/06
[52] U.S. Cl. ........................................ 525/64; 525/66; 525/71
[58] Field of Search ........................... 525/66, 64, 71

[56] References Cited

U.S. PATENT DOCUMENTS 5,004,782  4/1991  Mashita ................................. 525/64
5,240,998  8/1993  Faluso .................................. 525/66
5,244,970  9/1993  Kobayashi ........................... 525/63

FOREIGN PATENT DOCUMENTS 2285947  12/1987  Japan .

Primary Examiner—James J. Seidleck
Assistant Examiner—I. Zemel
Attorney, Agent, or Firm—Kane, Dalsimer, Sullivan, Kurucz, Levy, Eisele and Richard

[57] ABSTRACT

A thermoplastic resin composition comprising (A) 5 to 95 parts by weight of an olefinic resin and (B) 95 to 5 parts by weight of an acrylonitrile-styrenic copolymer is improved in compatibility between the olefinic resin and the acrylonitrile-styrenic copolymer by modifying at least a part of the acrylonitrile-styrenic copolymer with an epoxy compound and by incorporating an effective amount of at least one compatibilizer selected from the group consisting of styrene-ethylene-butadiene-styrene block copolymers modified with unsaturated carboxylic acids or anhydrides thereof, unsaturated carboxylic acid-olefine copolymers, and polymers reactive with an epoxy group.

6 Claims, No Drawings

THERMOPLASTIC RESIN COMPOSITION

This is a division of copending application Ser. No. 07/897,404, filed Jun. 12, 1992, now abandoned.

FIELD OF THE INVENTION

This invention relates to a thermoplastic resin composition comprising an olefinic resin and an acrylonitrile-styrenic copolymer, which may be used as a material for automobile parts, furniture, electric appliances and other shaped articles.

BACKGROUND OF THE INVENTION

Olefinic resins have excellent mechanical strength, moldability and chemical resistance, and are used in various commercial fields, such as in interior or exterior parts of automobiles, electric appliance parts and housings. However, polyolefines are nonpolar molecules and, therefore, have problems in secondary processing, particularly in adhesion and painting in a solid state. To improve such olefinic resins, polystyrene which has good adhesive property was blended to olefinic resins.

Among polystyrenic resins, styrene-acrylonitrile copolymers are excellent in chemical resistance, strength and heat resistance and, accordingly, blends thereof with olefinic resins were expected to exhibit various good properties.

However, olefinic resins are less compatible with styrenic resins. Therefore, blends of these suffer from decreased physical properties, particularly decrease in surface peeling resistance.

Accordingly, various compositions in which a compatibilizer is added to a composition of a polypropylene resin and a polystyrenic resin were proposed in order to improved their compatibility (Japanese Patent Application Laid-Open Nos. Sho-64-87945/1989 and Hei-1-174550/1989). All of these compositions contain styrene-non-conjugated diene block copolymers or the like.

Although the above compatibilizers can exhibit some degree of effects in compatibilization between polypropylene resins and polystyrenic resins, they have, however, almost no effect in compatibilization between polypropylene resins and styrene-acrylonitrile copolymers.

As mentioned above, it was impossible to obtain a composition of olefinic resins and styrene-acrylonitrile copolymers in which both are well compatibilized.

SUMMARY OF THE INVENTION

A purpose of the invention is to provide a thermoplastic resin composition comprising an olefinic resin and an acrylonitrile-styrenic copolymer, in which composition the olefinic resin and the acrylonitrile-styrenic copolymer are well compatibilized with each other, and which composition exhibits excellent surface properties and mechanical properties.

The present invention provides a thermoplastic resin composition comprising (A) 5 to 95 parts by weight of an olefinic resin and (B) 95 to 5 parts by weight of an acrylonitrile-styrenic copolymer, characterized in that
   at least a part of the acrylonitrile-styrenic copolymer (B) is modified with an epoxy compound, and
   the composition further comprises (C) an effective amount of at least one compatibilizer selected from the group consisting of styrene-ethylene-butadiene-styrene block copolymers modified with unsaturated carboxylic acids or anhydrides thereof, unsaturated carboxylic acid-olefine copolymers, and polymers reactive with an epoxy group.

DESCRIPTION OF THE PREFERRED EMBODIMENTS

In a preferred embodiment of the invention, the thermoplastic resin composition comprises
   (A) 5 to 95 parts by weight of an olefinic resin, wherein at least a part, preferably at least 1% by weight, of the olefinic resin may optionally be modified with a glycidyl compound represented by the following formula:

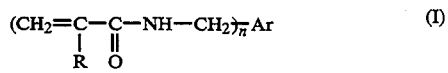

wherein R represents a hydrogen atom or an alkyl group having 1 to 6 carbon atoms, Ar represents a $C_{6-20}$ aromatic hydrocarbon radical which has at least one glycidoxy substituent and may have other substituents, and n represents an integer of 1 to 4,
   (B) 95 to 5 parts by weight of an acrylonitrile-styrenic copolymer, at least a part of which is an acrylonitrile-styrenic copolymer modified with an epoxy compound, and
   (C) 0.5 to 100 parts by weight of a styrene-ethylene-butadiene-styrene block copolymer modified with unsaturated carboxylic acid or anhydride thereof, the total of (A) and (B) being 100 parts by weight.

In a second preferred embodiment of the invention, the thermoplastic resin composition comprises
   (A) 5 to 95 parts by weight of an olefinic resin, wherein at least a part, preferably at least 1% by weight, of the olefinic resin may optionally be modified with a glycidyl compound represented by the following formula:

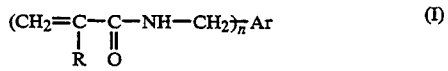

wherein R represents a hydrogen atom or an alkyl group having 1 to 6 carbon atoms, Ar represents a $C_{6-20}$ aromatic hydrocarbon radical which has at least one glycidoxy substituent and may have other substituents, and n represents an integer of 1 to 4,
   (B) 95 to 5 parts by weight of an acrylonitrile-styrenic copolymer, at least a part of which is an acrylonitrile-styrenic copolymer modified with an epoxy compound, and
   (C) 0.1 to 100 parts by weight of an unsaturated carboxylic acid-olefine copolymer, the total of (A) and (B) being 100 parts by weight.

In a third preferred embodiment of the invention, the thermoplastic resin composition comprises
   (A) 5 to 95 parts by weight of an olefinic resin,
   (B) 95 to 5 parts by weight of an acrylonitrile-styrenic copolymer, at least 1 % by weight of which is an acrylonitrile-styrenic copolymer modified with an epoxy compound, and
   (C) 0.1 to 100 parts by weight of a polymer reactive with an epoxy group, and further
   (D) 1 to 100 parts by weight of an olefine-unsaturated glycidyl compound copolymer, the total of (A)+(B) being 100 parts by weight, where, more preferably, at least 1% by weight of the olefinic resin (A) is such that is modified with unsaturated carboxylic acid or anhydride thereof.

In a fourth preferred embodiment of the invention, the thermoplastic resin composition comprises (A) 5 to 95 parts by weight of an olefinic resin, of which at least a part, preferably at least 1% by weight, is modified with a glycidyl compound represented by the following formula:

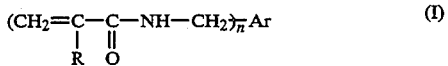

wherein R represents a hydrogen atom or an alkyl group having 1 to 6 carbon atoms, Ar represents a $C_{6-20}$ aromatic hydrocarbon radical which has at least one glycidoxy substituent and may have other substituents, and n represents an integer of 1 to 4, or modified with an unsaturated carboxylic acid or anhydride thereof, (B) 95 to 5 parts by weight of an acrylonitrile-styrenic copolymer, at least a part of which is an acrylonitrile-styrenic copolymer modified with an epoxy compound, and (C) 0.5 to 100 parts by weight of at least one selected from the group consisting of polyamides and polyesters, the total of (A) and (B) being 100 parts by weight.

The olefinic resin used in the invention may be any known olefinic resins, and include homopolymers of α-olefinic monomers such as ethylene, propylene, butene and 4-methylpentene, copolymers thereof, copolymers of these monomers with dienes and hydrogenated products thereof. The copolymers include both block copolymers and random copolymers. The olefinic resin is preferably a crystalline polymer composed mainly of propylene or may be a copolymer thereof with up to about 40% by weight of other α-olefine such as ethylene, butene and 4-methylpentene. This copolymer may be a random copolymer or block copolymer. Olefine random copolymers may also be used, which are composed further of a non-conjugated diene comonomer represented by the general formula:

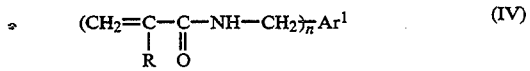

wherein $R^1$, $R^2$, $R^3$ and $R^4$ are independently a hydrogen atom or an alkyl group having 1 to 6 carbon atoms, and m is an integer of 1 to 20.

The olefinic resin modified with an epoxy compound is one in which a glycidyl compound represented by the above formula (I) is graft-polymerized to the aforesaid olefinic resin.

In formula (I), R is preferably a hydrogen atom or $CH_3$, and n is 1 to 4. Ar is preferably an alkyl-substituted or unsubstituted, mononuclear $C_{6-20}$ aromatic hydrocarbon radical or bisphenol A radical having one or two glycidoxy substituents. The optional substituents bound to the aromatic ring include alkyl groups such as methyl and ethyl groups, and halogen atoms.

As a particularly preferred glycidyl compound may be named a compound represented by the formula:

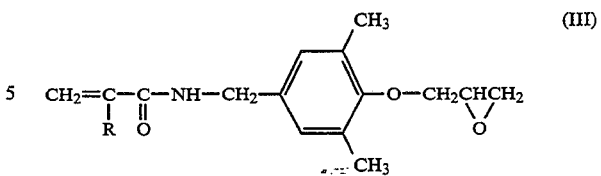

wherein R represents an hydrogen atom or an $C_{1-6}$ alkyl group, preferably an hydrogen or a methyl group.

This glycidyl compound may be prepared in the following method described in Japanese Patent Application Laid-Open No. Sho-60-130580/1985.

First, an aromatic hydrocarbon having at least one phenolic hydroxyl group is condensed, in the presence of acid catalyst, with N-methylol acrylamide, N-methylol methacrylamide or the like, or alkyl ether derivatives of N-methylol methacrylamide to prepare a compound represented by the formula:

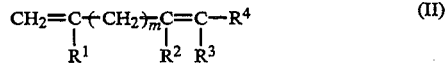

wherein R is an hydrogen atom or a $C_{1-6}$ alkyl group, $Ar^1$ is a $C_{6-20}$ aromatic hydrocarbon radical having at least one hydroxyl group, and n represents an integer of 1 to 4. Examples of the aforesaid aromatic hydrocarbon having at least one phenolic hydroxyl group include phenols, such as phenol, o-cresol, m-cresol, p-cresol, 2,6-xylenol, 2,4-xylenol, o-chlorophenol, m-chlorophenol, o-phenylphenol, p-chlorophenol and 2,6-diphenyl phenol; polyphenolic compounds, such as hydroquinone, catechol and phloroglucitol; polycyclic hydroxy compounds, such as 1-napthol, 2-naphtol and 9-hydroxyanthracene; and bisphenols, such as 2,2-bis(4-hydroxyphenyl)propane (or bisphenol A) and bis(4-hydroxyphenyl)methane, but are not limited to these.

Then, the compound of formula (IV) is bound, via its hydroxyl group, to a glycidyl compound to yield the glycidyl compound of formula (I). This reaction is preferably carried out in a way where the compound of formula (IV) is reacted with epihalohydrin, followed by dehydrohalogenation by caustic alkali. Phase transfer catalyst is used in the reaction with epihalohydrin. Examples of epihalohydrin include epichlorohydrin, epibromohydrin and epiiodohydrin.

Examples of the phase transfer catalyst include quaternary ammonium salts, such as tetrabutylammonium bromide, trioctylmethylammonium chloride and benzyltriethylammonium chloride; quaternary phosphonium salts, such as tetraphenylphosphonium chloride and triphenylmethylphosphonium chloride; and quaternary arsonium salts.

The amount of the phase transfer catalyst used is preferably in a range of from 0.01 to 100 mole %, more preferably from 0.05 to 10 mole %, based on the compound of formula (IV). The reaction is preferably conducted at 50° to 120° C. for 5 minutes to 2 hours, more preferably 80° to 110° C. for 10 to 30 minutes.

Examples of the caustic alkali used in the dehydrohalogenation include caustic soda, caustic potash, and lithium hydroxide. These may be used in a solid form or in an aqueous solution. Catalyst may be used for the dehydrohalogenation, such as those mentioned above as phase transfer catalyst. Crown ethers, ethylene glycol, diethylene glycol, triethylene glycol, tetraethylene glycol, polyethylene glycol and the like may also be used.

The caustic alkali is preferably used in an amount equimolar to the compound of formula (IV), more preferably in 1.1 to 1.5 times as much as the amount in mole. The reaction is preferably carried out at 20° to 90° C. for 10 minutes to 3 hours, more preferably 40° to 70° C. for 30 minutes to 2 hours.

The reaction of the glycidyl compound of formula (I) with the olefinic resin may be carried out either in a solution or by melt kneading, the latter being preferred. In the melt kneading, the glycidyl compound, the olefinic resin and, if needed, a catalyst are put in a single or twin screws extruder, Bumbury mixer or batchwise kneader, and kneaded for 0.1 to 20 minutes while heating to melt at 200° to 300° C., preferably, at 220° to 260° C. In the solution method, the aforesaid starting materials are dissolved in an organic solvent such as xylene and stirred at 90° to 200° C. for 0.1 to 100 hours. In either way, usual radical polymerization catalysts may be used. Preferred are, for instance, peroxides such as benzoyl peroxide, lauroyl peroxide, di-tertiary-butyl peroxide, acetyl peroxide, tert.-butyl peroxybenzoic acid, dicumyl peroxide, peroxybenzoic acid, peracetic acid, tert.-butyl peroxypivalate and 2,5-dimethyl-2,5-di-tert.-butyl peroxyhexyne; and diazo compounds such as azobisisobutylonitrile. The amount of the catalyst added is approximately 0.1 to 10 parts by weight per 100 parts by weight of the glycidyl compound. Also, a phenolic antioxidant may be added in the above reaction, but it is better not to use it when the radical polymerization catalyst is not added.

The glycidyl compound is used in an amount of 0.01 to 30 parts by weight, preferably 0.1 to 10 parts by weight, per 100 parts by weight of the olefinic resin. If the amount of the glycidyl compound is less than 0.01 part by weight, a sufficient degree of graft reaction cannot be attained. Meanwhile, if it is exceeds 30 parts by weight, molecular weight of the modified olefinic resin obtained will decrease.

In this reaction, the glycidyl compound graft-polymerizes on the olefinic resin. Generally, 70 to 95%, particularly 80 to 90%, of the Glycidyl compound used is actually grafted. It is Generally preferred that approximately 0.1 to 10 parts by weight of the glycidyl compound are grafted per 100 parts by weight of the olefinic resin.

In the case where the styrene-ethylene-butadiene-styrene block copolymer modified with unsaturated carboxylic acid or anhydride thereof or the unsaturated Carboxylic acid-olefine copolymer is selected as the compatibilizer, the effects of the invention are better attained by incorporating at least 1 part by weight of the epoxy-modified olefinic resin among 100 parts by weight of the olefinic resin.

Another modified olefinic resin, i.e., olefinic resin modified with unsaturated carboxylic acid or anhydride thereof is one in which unsaturated carboxylic acid or anhydride thereof is graft-polymerized on the olefinic resin. Examples of the unsaturated acid or anhydride thereof include monocarboxylic acids, such as acrylic acid and methacrylic acid; dicarboxylic acids, such as maleic acid, fumaric acid and itaconic acid; and dicarboxylic acid anhydrides, such as maleic anhydride, fumaric anhydride, itaconic anhydride, and endo-bicyclo[2,2,1]-5-heptene-2,3-dicarboxylic anhydride (or nadic anhydride). The olefinic resin to be modified may be any of graft copolymers, random copolymers, block copolymers or alternating copolymers.

Reaction of polyolefine with unsaturated carboxylic acid or anhydride thereof may be carried out either in a solution or by melt kneading, the latter being preferred. In the melt kneading, the unsaturated carboxylic acid or anhydride thereof, the olefinic resin and, if needed, a catalyst are put in a single or twin screws extruder, Bumbury mixer or batchwise kneader, and kneaded for 0.1 to 20 minutes while heating to melt at 180° to 250° C. In the solution method, the aforesaid starting materials are dissolved in an organic solvent such as xylene and stirred at 80° to 140° C. for 0.1 to 100 hours. In either way, usual radical polymerization catalysts may be used. Preferred are, for instance, peroxides such as benzoyl peroxide, lauroyl peroxide, di-tertiary-butyl peroxide, acetyl peroxide, tert.-butyl peroxybenzoic acid, dicumyl peroxide, peroxybenzoic acid, peracetic acid, tert.-butyl peroxypivalate and 2,5-dimethyl-2,5-di-tert.-butyl peroxyhexyne; and diazo compounds such as azobisisobutylonitrile. The amount of the catalyst added is approximately 0.1 to 100 parts by weight per 100 parts by weight of the unsaturated carboxyl acid or anhydride thereof. Also, a phenolic antioxidant may be added in the above reaction, but it is better not to use it when the radical polymerization catalyst is not added.

A graft ratio of the unsaturated carboxylic acid or anhydride thereof on the olefinic resin is preferably 0.1 to 8% by weight, more preferably 0.3 to 5% by weight. The polyolefine thus modified with unsaturated carboxylic acid or anhydride thereof preferably has a melt flow rate (MFR) of 0.1 to 300 g/10 minutes, as determined at 230° C. with a load of 2.16 kg. Hereinafter, an MFR will be determined in the above conditions.

Hereinafter, second component (B) will be explained.

The acrylonitrile-styrenic copolymer used in the invention is a copolymer containing recurring units derived from acrylonitrile and recurring units derived from styrenes. The content of acrylonitrile is usually 2 to 50% by weight, preferably 20 to 30% by weight, based on the acrylonitrile-styrenic copolymer. Examples of the acrylonitrile-styrenic copolymer also include those in which olefinic rubber is also copolymerized, such as acrylonitrile-butadiene-styrene resins in which about 40% by weight or less of olefinic rubber such as polybutadiene rubber is grafted (ABS resin), and acrylonitrile-ethylene-propylene rubber-styrene resins in which about 40% by weight or less of ethylene-propylene copolymeric rubber (or EP rubber) is grafted (AES resin).

The acryronitrile-styrenic copolymer preferably has a melt flow rate (MFR) of 1 to 60 g/10 minutes and weight average molecular weight (Mw) of 10,000 to 1,000,000.

The acrylonitrile-styrenic copolymer modified with an epoxy compound is a copolymer of acrylonitrile, styrenes and unsaturated epoxy compound. For the acrylonitrile-styrenic parts, the aforesaid acrylonitrile-styrenic copolymers may be used. Examples of the unsaturated epoxy compound include unsaturated glycidyl esters represented by the following formula:

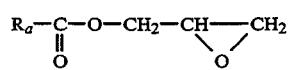

wherein $R_a$ represents $C_{2-18}$ hydrocarbon radical-having ethylenical unsaturation; and unsaturated glycidyl ethers represented by the following formula:

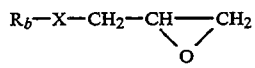

wherein $R_b$ is a $C_{2-18}$ hydrocarbon radical having ethylenical unsaturation and X represents —CH$_2$—O— or —Y—O—, wherein Y is a phenylene group.

As the unsaturated glycidyl esters or ethers, preferred are glycidyl acrylate, glycidyl methacrylate, itaconic glycidyl esters, allylglycidyl ether, 2-methyl allylglycidyl ether and styrene-p-glycidyl ether. Glycidyl methacrylate is particularly preferred. In addition, unsaturated carboxylic acid ester monomers such as methyl methacrylate may further be contained up to 99.9% by weight of the epoxy-modified acrylonitrile-styrenic copolymer.

The acrylonitrile content in the epoxy-modified acrylonitrile-styrenic copolymer is usually 2 to 50% by weight, preferably 20 to 30% by weight, based on the whole copolymer, and the content of the unsaturated epoxy compound is usually 0.1 to 70% by weight, preferably 5 to 10% by weight. The epoxy-modified acrylonitrile styrenic copolymer preferably has a melt flow rate (MFR) of 1 to 60 g/10 minutes and Mw of 10,000 to 1,000,000.

The epoxy-modified acrylonitrile styrenic copolymer may be prepared by polymerizing the acrylonitrile-styrenic copolymer with the unsaturated epoxy compound in bulk polymerization, emulsion polymerization, suspension polymerization, or solution polymerization.

Component (B) of the composition according to the invention consists of preferably at least 1% by weight of the epoxy-modified acrylonitrile-styrenic copolymer and the remaining part of the unmodified acrylonitrile-styrenic copolymer. The aforesaid components (A) and (B) are usually blended in a weight ratio of (A) to (B) of from 5/95 to 95/5, preferably from 10/90 to 90/10.

Hereinafter, the compatibilizer (C) will be described.

Styrene-ethylene-butadiene-styrene block copolymers (SEBS) are known per se. In the present invention, preferred are those composed of 10 to 70% by weight of polystyrene blocks and 30 to 90% by weight of ethylene-butadiene blocks. Examples of the modifying monomer, unsaturated carboxylic acid or anhydride thereof, include monocarboxylic acids, such as acrylic acid and methacrylic acid; dicarboxylic acids, such as maleic acid, fumaric acid and itaconic acid; and dicarboxylic anhydrides, such as maleic anhydride, fumaric anhydride, itaconic anhydride, and endo-bicyclo[2,2,1]-5-heptene-2,3-dicarboxylic anhydride (or nadic anhydride).

The modified SEBS may be prepared by grafting the aforesaid modifying monomer on SEBS in melt or solution radical reaction. A graft ratio is preferably 0.1 to 10% by weight, more preferably 0.2 to 3% by weight.

The modified SEBS is preferably used in an amount of 0.5 to 100 parts by weight, more preferably 1 to 10 parts by weight, per 100 parts by weight of the total of components (A) and (B). If the amount of the modified SEBS is less than 0.5 part by weight, the olefinic resin is not sufficiently compatible with the acrylonitrile-styrenic copolymer. Meanwhile, if it exceeds 100 parts by weight, flowability of a resultant composition is low and its rigidity is also low.

The modified SEBS (C) contains carboxylic acid or anhydride which is well compatible with both components (A) and (B). Particularly when the epoxy-modified olefinic resin is used, the carboxylic acid or anhydride group of (C) may well react with both the epoxy group of the modified olefinic resin and the epoxy Group of the modified acrylonitrile-styrenic copolymer. Such reaction may occur during melt kneading to form a grafted product, olefinic resin/SEBS/acrylonitrile-styrenic copolymer, which, in turn, reacts as a compatibilizer. It is believed that compatibility between the olefinic resin and the acrylonitrile-styrenic copolymer may be improved in the above mechanism, but the invention is not limited by this theory.

Next, the unsaturated carboxylic acid-olefine copolymer is a copolymer of one or more unsaturated carboxylic acid monomers with one or more olefine monomers. Examples of the unsaturated carboxylic acid monomers include monocarboxylic acid such as acrylic acid and methacrylic acid, and dicarboxylic acid such as maleic acid, fumaric acid and itaconic acid. As the olefine, olefine such as ethylene and propylene may be used alone or in mixture and, preferably, is selected to be the same as that of the olefinic resin (A). The unsaturated acid-olefine copolymer usually has an unsaturated acid monomer content of 0.1 to 99.9% by weight, preferably 0.5 to 10% by weight, and weight average molecular weight (Mw) of, preferably, 10,000 to 1,000,000. This copolymer may be prepared in random polymerization or coordinated living polymerization.

It is believed that the unsaturated carboxylic acid-olefine copolymer (C) reacts with the epoxy group of the epoxy-modified acrylonitrile-styrenic copolymer (B) to form a grafted product, unsaturated acid-olefine copolymer/epoxy-modified acrylonitrile-styrenic copolymer, which functions as a compatibilizer because its unsaturated carboxylic acid-olefine copolymer part is compatible with the olefinic resin (A). Further, where the olefinic resin contains the epoxy-modified olefinic resin, its epoxy group will react with the unsaturated carboxylic acid-olefine copolymer, resulting in a larger compatibilizing effect.

Thirdly, the polymers reactive with an epoxy group may be any ones which can react with an epoxy group, particularly the epoxy group of the epoxy-modified acrylonitrile-styrenic copolymer, and are preferably selected from the group consisting of polyamides and polyesters, including polycaprolactone. Polyamides are known per se and include various nylon such as nylon-4, nylon-6, nylon-6,6, nylon-12 and nylon-6,10, and polyamideimide. These may be used alone or in mixture. Nylon-6 and nylon-6,6 are preferred on account of their reaction efficiency, moldability and influence on mechanical properties.

Polyesters are known per se and are thermoplastic resins composed generally of a saturated dicarboxylic acid component and a saturated dihydric alcohol component, or thermoplastic resins obtained by ring opening polymerization of cyclic esters. The saturated dicarboxylic acids include terephthalic acid, isophthalic acid and adipic acid. The saturated dihydric alcohols include ethylene glycol, propylene glycol, butylene glycol, hexamethylene glycol and bisphenol A. More specifically, polyethylene terephthalate (PET), polybutylene terephthalate (PBT), polyhexamethylene terephthalate, polycyclohexane-1,4-dimethylol terephthalate, polyneopentyl terephthalate and polyarylate. The cyclic esters include ε-caprolactone such as polycaprolactone, particularly, with number average molecular weight of 1 to 100,000. These may be used alone or in mixture. Among these, polyethylene terephthalate and polybutylene terephthalate are preferred on account of reaction efficiency, moldability and influence on mechanical properties. Polyethylene terephthalate preferably has an intrinsic viscosity of 0.30 to 0.80 and a terminal carboxyl group concentration of 15 to 200 m equivalents per kg. If the intrinsic viscosity exceeds 0.80, melt viscosity of its graft copolymer is too high to cause gel. The terephthalic acid component may have substituents such as alkyl groups and halogen atoms. The glycol component may contain up to approximately 50% by weight of other glycols than ethylene glycol, such as 1,4-butylene glycol, propylene glycol and hexamethylene glycol. Polybutylene terephthalate preferably has an intrinsic viscosity of 0.30 to 1.20 and a terminal carboxyl group concentration of 15 to 200 m equivalents per kg. The terephthalic acid component may have substituents such as alkyl groups and halogen atoms. The glycol component may contain up to approximately 50% by weight of other glycols than 1,4-butylene glycol, such as ethylene glycol, propylene glycol and hexamethylene glycol.

The polymer reactive with an epoxy group is used in an amount of 0.1 to 100 parts by weight, preferably 0.5 to 10 parts, per 100 parts by weight of the total of components (A) and (B). If this is less than 0.1 part by weight, the compatibility attained is insufficient. Meanwhile, if this exceeds 100 parts by weight, flowability of a resultant composition is low.

In the third preferred embodiment, the olefine-unsaturated glycidyl compound copolymer (D) is further added in the composition. The unsaturated glycidyl compound includes those mentioned in connection to the epoxy-modified acrylonitrile-styrenic copolymer (B), that is, unsaturated glycidyl esters and unsaturated glycidyl ethers. More specifically, glycidyl acrylate, glycidyl methacrylate, itaconic glycidyl esters, allylglycidyl ether, 2-methylallylglycidyl ether and styrene-p-glycidyl ether may be named. Glycidyl methacrylate is particularly preferred. As the olefine, olefines such as ethylene and propylene may be used alone or in mixture. Ethylene-glycidyl methacrylate copolymers are preferred. The content of the unsaturated glycidyl compound is usually 0.1 to 30% of the copolymer.

The olefine-unsaturated glycidyl compound copolymer (D) is usually used in an amount of 1 to 100 parts by weight, preferably 3 to 10 parts by weight, per 100 parts by weight of the total of components (A) and (B). If this is less than 1 part by weight, compatibility is insufficient. Meanwhile, if this exceeds 100 parts by weight, rigidity of a composition will low and mouldability worsens due to increased melt viscosity. It is preferred in the third preferred embodiment that at least 1% by weight of the olefinic resin is the olefinic resin modified with unsaturated carboxylic acid or anhydride thereof as mentioned above.

It is believed that the polymer reactive with an epoxy group (C) reacts with both the epoxy group of the olefine-unsaturated glycidyl compound copolymer (D) and the epoxy group of the epoxy-modified acrylonitrile-styrenic copolymer (B). Thus, a grafted product, olefine-unsaturated glycidyl compound copolymer-/epoxy-reactive polymer/epoxy-modified acrylonitrile-styrenic copolymer, is formed during melt kneading via such reaction. In addition, the olefine-unsaturated glycidyl compound copolymer moiety is compatible with the olefinic resin (A). Accordingly, the grafted product can functions as a compatibilizer. When the olefinic resin modified with unsaturated carboxylic acid or anhydride thereof is present in the composition, this carboxylic acid or anhydride reacts with the epoxy group of the olefine-unsaturated glycidyl compound copolymer, which further enhances compatibility compared to the case where no modified-olefinic resin is present, and thus a higher compatibilization effect is attained. It is believed that compatibility between components (A) and (B) is improved via such mechanism.

In the forth preferred embodiment, the polyamide and polyester are those mentioned above in connection with the third embodiment. The polyamide or polyester is blended in an amount of 0.5 to 100 parts by weight, preferably 1 to 10 parts by weight. If the amount is less than 0.5 part, compatibility is insufficient. Meanwhile, if this exceeds 100 parts, physical properties and moldability are worse due to increased water absorption. It is believed that the polyamide or polyester (C) reacts with both the acid or epoxy group of the modified olefinic resin (A) and the epoxy group of the epoxy-modified acrylonitrile-styrenic copolymer. Thus, a grafted product, modified olefinic resin/polyamide (or polyester)-/epoxy-modified acrylonitrile-styrenic copolymer, is formed via such reaction during melt kneading, which functions as a compatibilizer. It is believed that compatibility between components (A) and (B) is improved through the above mechanism.

To the resin composition according to the invention, any conventional additives may further be added, such as pigments, dyes, fillers, reinforcing agents, heat stabilizers, photo stabilizers, antioxidants, plasticizers, flame retardants, antistatics, releasing agents, foaming agents, nucleating agents and so on.

The resin composition according to the invention may be prepared by melt kneading the aforesaid components. Melt kneading is conducted usually at 200° to 300° C., preferably 230° to 280° C. Any conventional apparatus for melt kneading may be used, such as single or twin screws extruders, Bumbury mixers, kneading rolls, Brabender kneaders, Henschel mixers and other batchwise kneaders.

It is further found that one more unusual composition exhibits good compatibility. The composition comprises (A) 5 to 95 parts by weight of an olefinic resin, (B) 5 to 95 parts by weight of an acrylonitrile-styrenic copolymer, and (C) 5 to 100 parts by weight of a copolymer composed of (i) olefinic polymer or copolymer, (ii) styrenic monomer and (iii) acrylonitrile monomer, wherein the total of (A) and (B) is 100 parts by weight. The amount of copolymer (C) is 5 to 100 parts by weight, preferably 10 to 30 parts by weight. If the amount is less than 5 parts by weight, sufficient compatibility is not attained. If it exceeds 100 parts by weight, rigidity of the composition is low. The olefinic polymer or copolymer (i) includes polymers or copolymers of olefinic monomers such as ethylene, propylene, butene and pentene, such as ethylene-propylene copolymers; copolymers of olefinic monomers with dienes, such as ethylene-propylene-diene copolymers, wherein the dienes are, for instance, ethylidene norbornene and 1,4-hexadiene; and copolymers of olefinic monomers with acrylic esters, such as ethylene-butyl acrylate copolymers. The styrenic monomer (ii) includes styrene, methyl styrene and chlorostyrene, and one or more of these may be used. The acrylonitrile monomer (iii) includes acrylonitrile and methacrylonitrile, and one or more of these may used. There is no particular limitation on the ratios of (i), (ii) and (iii), which may be decided depending upon applications. The copolymer may be random copolymer, block copolymer or graft copolymer. Preferred are graft copolymers in which styrenic monomer (ii) and acrylonitrile monomer (iii) are grafted on olefinic polymer or copolymer (i). Examples of (C) include acrylonitrile-ethylene-propylene-styrene copolymers and acrylonitrile-ethylene-propylene-diene-styrene copolymers. It is believed that the polymeric or copolymeric part (i) is well compatible with the olefinic resin (A) and the styrenic part (ii) and the acrylonitrile part (iii) are compatible with the acrylonitrile-styrenic copolymer (B) and, therefore, (C) may acts as a compatibilizer for a blend of (A) and (B).

EXAMPLES

The invention will be further explained hereinafter in reference to the following Examples.

The following materials were used in the Examples and Comparison Examples.

1. Olefinic resins 1-1 Polypropylene homopolymer, Hereinafter referred to as PP:

J 209 available from Tonen Chemical Corp., having a melt flow rate (MFR) of 9.0 g/10 min. as determined at a temperature of 230° C. with a load of 2.16 kg (hereinafter, a MFR was determined under the above conditions).

1-2 Ethylene-propylene block copolymer, hereinafter referred to as EPC:

BJ309 available from Tonen Chemical Corp., having a MFR of 9.0 g/10 min. and an ethylene content of 7.5% by weight.

2. Modified olefinic resins 2-1 Epoxy-modified polypropylene (1)

A hundred parts by weight of a polypropylene homopolymer, Y 201 available from Tonen Chemical Corp., having a MFR of 1.5 g/10 min. were melt kneaded for reaction with three parts by weight of a glycidyl group-containing unsaturated compound available from Kanegafuchi Chemical Industries Inc., (hereinafter referred to as AXE) represented by the following formula:

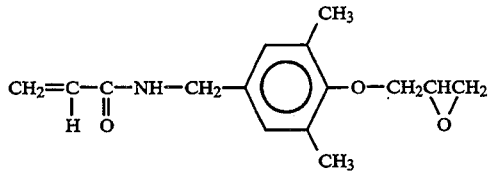

in the presence of 0.1 part by weight of PERHEXYNE 2-5B available from Nippon Oils & Fats Inc. as a peroxide catalyst at 200° C. and 30 rpm. with a twin screws extruder, TEX 44. The epoxy-modified polypropylene obtained had an AXE content of 2.4% by weight and a MFR of 7.6 g/10min.. The epoxy-modified polypropylene will hereinafter be abbreviated to AXE-PP-A.

2-2 Epoxy-modified polypropylene (2)

An epoxy-modified polypropylene was prepared as described above, except that the amount of AXE used was 7 parts by weight. The epoxy-modified polypropylene obtained had an AXE content of 4.0% by weight and a MFR of 200 g/10 min. The epoxy-modified polypropylene will hereinafter be abbreviated to AXE-PP-B.

2-3 Maleic anhydride-modified polypropylene

A hundred parts by weight of a polypropylene homopolymer (trade mark: Y 201, available from Tonen Chemical Corp., having a MFR of 1.5 g/10 min.), three parts by weight of maleic anhydride (MAH) and one part by weight of PERHEXYNE 2-5B (available from Nippon Oils & Fats Inc.) as a peroxide catalyst were dry-blended and then melt kneaded for graft reaction at 230° C. and 100 rpm. with a 65 mm twin screws extruder to prepare a maleic anhydride-modified polypropylene (hereinafter referred to as MAH-PP). Average reaction time during the graft reaction was about one minute. The maleic anhydride graft content of MAH-PP obtained was 0.3% by weight.

2-4 Maleic anhydride-modified propylene-unconjugated diene random copolymer

A hundred parts by weight of propylene-unconjugated diene random copolymer (PPDM), five parts by weight of maleic anhydride (MAH) and 0.5 part by weight of PERHEXYNE 2-5B (available from Nippon Oils & Fats Inc.) as a peroxide catalyst were dry-blended and then melt kneaded for graft reaction at 230° C. and 100 rpm. with a 45 mm twin screws extruder to prepare a maleic anhydride-modified propylene-unconjugated diene random copolymer (hereinafter referred to as MAH-PPDM). Average reaction time during the graft reaction was about one minute. A maleic anhydride graft content of MAH-PPDM obtained was 2.5% by weight.

3. Acrylonitrile-styrenic copolymer 3-1 Acrylonitrile-styrene random copolymer, hereinafter referred to as AS-1:

AS 230 (available from Japan Synthetic Rubber Inc.) having a MFR of 6.62 g/10 min. and an acrylonitrile content of 25% by weight.

3-2 Acrylonitrile-styrene random copolymer, hereinafter referred to as AS-2:

AS 290 ZF (available from Japan Synthetic Rubber Inc.) having a MFR of 20.0 g/10 min. and an acrylonitrile content of 32% by weight.

3-3 Acrylonitrile-butadiene-styrene (ABS) resin, hereinafter referred to as ABS:

ABS-10 (available from Japan synthetic Rubber Inc.) having a MFR of 10 g/10 min. and an acrylonitrile content of 25% by weight based on the acrylonitrile-styrene.

4. Epoxy-modified acrylonitrile-styrenic copolymer 4-1 Acrylonitrile-styrene-glycidyl methacrylate random copolymer, hereinafter referred to as GMA-AS-1:

MARPROOF G-1505 SA (available from Nippon Oils & Fats Inc.) having a glycidyl methacrylate (GMA) content of 5% by weight, an acrylonitrile content of 27% by weight based on the acrylonitrile-styrene, weight average molecular weight (Mw) of 150,000 and number average molecular weight (Mn) of 55,000.

4-2 Acrylonitrile-styrene-glycidyl methacrylate random copolymer, hereinafter referred to as GMA-AS-2:

MARPROOF G-1005 SA (available from Nippon Oils & Fats Inc.) having a glycidyl methacrylate (GMA) content of 5% by weight, an acrylonitrile content of 27% by weight based on the acrylonitrile-styrene, weight average molecular weight (Mw) of 100,000 and number average molecular weight (Mn) of 40,000.

4-3 Acrylonitrile-styrene-glycidyl methacrylate random copolymer (hereinafter referred to as GMA-AS-3):

BLENMER CP 510 SA (available from Nippon Oils & Fats Inc.) having an epoxy equivalent of 1500, an acrylonitrile content of 27% by weight based on the acrylonitrile-styrene, weight average molecular weight (Mw) of 50,000 and number average molecular weight (Mn) of 19,000.

5. Styrene-ethylene-butadiene-styrene(SEBS) block copolymer, hereinafter referred to as SEBS:

TUFTEC H-1041 (available from Asahi Kasei Industries Inc.)

6. Modified styrene-ethylene-butadiene-styrene (SEBS) block copolymer, hereinafter referred to as MAH-SEBS:

TUFTEC M-1913 (available from Asahi Kasei Industries Inc.) having a maleic anhydride graft content of 1.0% by weight.

7. Unsaturated carboxylic acid-olefin copolymer

Ethylene-acrylic acid copolymer, hereinafter referred to as EAA:

PRIMACOL 3440 (available from Daw Chemical Inc.) having an acrylic acid content of 9% by weight and a MFR of 37.0 g/10 min.

8. Polyamide

Nylon-6:

A 28 (available from Ems Japan Inc.) having a number average molecular weight (Mn) of 18,000 (hereinafter referred to as Ny-6).

9. Polyester 9-1 Polybutylene terephthalate (PBT):

TRB-K (available from Teijin Inc.) having a number average molecular weight (Mn) of 20,000 (hereinafter referred to as PBT-1).

9-2 Polybutylene terephthalate (PBT):

C 7000N (available from Teijin Inc.) having an intrinsic viscosity [$\eta$]of 1.05, as determined in o-chlorophenol at 25° C. (hereinafter referred to as PBT-2).

10. Optional components 10-1 ethylene-glycidyl methacrylate copolymer:

BONDFAST E (available from Sumitomo Chemical Inc.) having a GMA content of 12.3% by weight and weight average molecular weight (Mw) of 263,000 (hereinafter referred to as EGMA).

10-2 Glycidyl methacrylate-methyl methacrylate copolymer, hereinafter referred to as GMA-PMMA:

BLENMER CP 50M (available from Nippon Oils & Fats Inc.) having an epoxy equivalent of 310, weight average molecular weight (Mw) of 10,000 and number average molecular weight (Mn) of 6,000.

10-3 Acrylonitrile-ethylene-propylene-styrenic copolymer (AES)

Acrylonitrile-ethylene-propylene-styrene resin (1), hereinafter referred to as AES-1:

AES 110 (available from Japan Synthetic Rubber Inc.)

Acrylonitrile-ethylene-propylene-styrene resin (2), hereinafter referred to as AES-2:

AES 117 (available from Japan Synthetic Rubber Inc.)

Examples 1 to 10 and Comparison Examples 1 to 5

Components used were mixed at room temperature with a Henschel mixer in the amounts as indicated in Tables 1 and 2 (% by weight), followed by kneading at 250° C. and 200 rpm. with a 45 mm twin screws extruder and then cooling extrudates rapidly in water to obtain pellets of the thermoplastic resin compositions.

MFR, peeling resistance, Izod impact strength (according to JIS K7110 at −30° C.), tensil strength (according to JIS K7113), elongation at break (according to JIS K7113), bending modulus (according to JIS K7203) and heat distortion temperature (HDT) (according to JIS K7207) were determined on the resin compositions obtained. The results are summarized in Tables 1 and 2.

Peeling resistance was evaluated as follows: the surface of pellets was notched to prepare a hundred squares (each 1 mm$^2$) and was subjected to a tape-peeling test. The number of squares which remain unpeeled off is the score.

TABLE 1

| | Component, parts by weight | Example 1 | 2 | 3 | 4 | 5 | 6 | 7 | 8 | 9 | 10 |
|---|---|---|---|---|---|---|---|---|---|---|---|
| (A) | PP | 55 | 55 | 55 | 55 | 45 | 75 | | 50 | 60 | |
| | EPC | | | | | | | 60 | | | 60 |
| | AXE-PP-A | 10 | 10 | 10 | 10 | | 5 | | 5 | | |
| | AXE-PP-B | | | | | 20 | | 10 | | | |
| (B) | AS-1 | 25 | 25 | 25 | 30 | 20 | 12.5 | 25 | | 30 | 30 |
| | ABS | | | | | | | | 35 | | |
| | GMA-AS-1 | 5 | | | 2.5 | | | 2.5 | | | |
| | GMA-AS-2 | | 5 | | | 10 | | | | 5 | 5 |
| | GMA-AS-3 | | | 5 | | | 2.5 | | 5 | | |
| (C) | MAH-SEBS | 5 | 5 | 5 | 2.5 | 5 | 2.5 | 2.5 | 5 | 5 | 5 |
| | Optional component GMA-PMMA | | | | | | 2.5 | | | | |
| | Properties | | | | | | | | | | |
| | MFR (g/10 min.) | 3.6 | 3.4 | 7.2 | 3.5 | 14.3 | 8.5 | 8.9 | 7.3 | 4.3 | 4.1 |
| | Peeling resistance | 100 | 100 | 100 | 97 | 100 | 100 | 100 | 100 | 86 | 88 |
| | Izod impact strength (−30° C.) (kgf · cm/cm) | 2.2 | 2.3 | 2.1 | 1.9 | 2.1 | 2.3 | 6.3 | 6.6 | 2.6 | 6.2 |
| | Tensil strength (kgf/cm$^2$) | 398 | 400 | 389 | 443 | 399 | 342 | 296 | 283 | 421 | 276 |
| | Elongation at break (%) | 5.3 | 6.4 | 4.9 | 4.3 | 4.8 | 5.0 | 6.2 | 7.7 | 4.2 | 3.8 |
| | Bending modulus (kgf/cm$^2$) | 21,000 | 21,200 | 20,800 | 22,300 | 20,900 | 15,600 | 14,900 | 12,100 | 19,600 | 13,900 |
| | HDT (°C.) | 100.5 | 100.6 | 98.3 | 103.8 | 100.8 | 99.9 | 96.7 | 94.8 | 98.6 | 95.9 |

TABLE 2

| | Comparison Example | | | | |
|---|---|---|---|---|---|
| | 1 | 2 | 3 | 4 | 5 |
| Component, parts by weight | | | | | |
| (A) PP | 65 | 55 | 65 | 60 | 60 |
| EPC | | | | | |
| AXE-PP-A | | | | 5 | 5 |
| AXE-PP-B | | 10 | | | |
| (B) AS-1 | 35 | 35 | 30 | 30 | 25 |
| ABS | | | | | |
| GMA-AS-1 | | | 5 | 5 | 5 |
| GMA-AS-2 | | | | | |
| GMA-AS-3 | | | | | |
| (C) MAH-SEBS | | | | | |
| SEBS | | | | | 5 |
| Properties | | | | | |
| MFR (g/10 min.) | 16.0 | 19.8 | 16.3 | 16.8 | 15.3 |
| Peeling resistance | 0 | 0 | 0 | 0 | 0 |
| Izod impact strength (−30° C.) (kgf · cm/cm) | 1.0 | 0.9 | 1.0 | 1.1 | 2.0 |
| Tensil strength (kgf/cm$^2$) | 389 | 325 | 391 | 378 | 340 |
| Elongation at break (%) | 3.7 | 3.7 | 3.7 | 3.4 | 4.6 |
| Bending modulus (kgf/cm$^2$) | 20,300 | 18,900 | 20,200 | 20,400 | 15,700 |
| HDT (°C.) | 100.3 | 100.7 | 100.3 | 101.0 | 97.3 |

TABLE 4

| | Comparison Example | | | | |
|---|---|---|---|---|---|
| | 6 | 7 | 8 | 9 | 10 |
| Component, parts by weight | | | | | |
| (A) PP | 65 | 55 | 65 | 60 | 60 |
| EPC | | | | | |
| AXE-PP-A | | 10 | | 5 | |
| AXE-PP-B | | | | | |
| (B) AS-1 | 35 | 35 | 30 | 30 | 30 |
| ABS | | | | | |
| GMA-AS-1 | | | 5 | 5 | |
| GMA-AS-2 | | | | | |
| GMA-AS-3 | | | | | |
| (C) EAA | | | | | 10 |
| Optional component GMA-PMMA | | | | | |
| Properties | | | | | |
| MFR (g/10 min.) | 16.0 | 15.2 | 16.3 | 18.2 | 9.9 |
| Peeling resistance | 0 | 0 | 0 | 0 | 0 |
| Izod impact strength (−30° C.) (kgf · cm/cm) | 1.0 | 1.1 | 1.0 | 1.0 | 1.8 |
| Tensil strength (kgf/cm$^2$) | 389 | 378 | 391 | 385 | 271 |
| Elongation at break (%) | 3.7 | 3.9 | 3.7 | 3.6 | 3.3 |
| Bending modulus | 20,300 | 20,100 | 20,200 | 21,300 | 16,240 |
| HDT (°C.) | 100.3 | 100.3 | 100.3 | 100.6 | 96.3 |

Examples 11 to 19 and Comparison Examples 6 to 10

Components used were mixed at room temperature with a Henschel mixer in the amounts as indicated in Tables 3 and 4 (% by weight), followed by kneading at 250° C. and 200 rpm. with a 45 mm twin screws extruder and then cooling extrudates rapidly in water to obtain pellets of the thermoplastic resin compositions.

MFR, peeling resistance, Izod impact strength (at −30° C.), tensil strength, elongation at break, bending modulus and heat distortion temperature (HDT) were determined on the resin compositions obtained. The results are summarized in Tables 3 and 4.

Examples 20 to 32 and Comparison Examples 11 to 15

Components used were mixed at room temperature with a Henschel mixer in the amounts as indicated in Tables 5 to 7 (% by weight), followed by kneading at 250° C. and 200 rpm. with a 45 mm twin screws extruder and then cooling extrudates rapidly in water to obtain pellets of the thermoplastic resin compositions.

MFR, peeling resistance, Izod impact strength (at −30° C.), tensil strength, elongation at break, bending modulus and heat distortion temperature (HDT) were determined on the resin compositions obtained. The results are summarized in Tables 5 to 7.

TABLE 3

| | Example | | | | | | | | |
|---|---|---|---|---|---|---|---|---|---|
| | 11 | 12 | 12 | 14 | 15 | 16 | 17 | 18 | 19 |
| Component, parts by weight | | | | | | | | | |
| (A) PP | 60 | 55 | 55 | 45 | 50 | 55 | 70 | — | 60 |
| EPC | — | — | — | — | — | — | — | 60 | — |
| AXE-PP-A | — | — | — | — | 10 | 10 | 10 | — | — |
| AXE-PP-B | — | — | 5 | 15 | — | — | — | 5 | 5 |
| (B) AS-1 | 30 | 25 | 30 | 25 | 30 | 27 | 15 | 29 | — |
| ABS | — | — | — | — | — | — | — | — | 29 |
| GMA-AS-1 | 5 | 10 | 5 | 10 | — | — | — | — | — |
| GMA-AS-2 | — | — | — | — | 5 | — | — | 3 | — |
| GMA-AS-3 | — | — | — | — | — | 2.5 | 3 | — | 3 |
| (C) EAA | 5 | 10 | 5 | 5 | 5 | 3 | 2 | 3 | 3 |
| Optional component GMA-PMMA | — | — | — | — | — | 2.5 | — | — | — |
| Properties | | | | | | | | | |
| MFR (g/10 min.) | 6.1 | 6.3 | 8.5 | 10.1 | 8.4 | 8.5 | 9.8 | 11.8 | 12.5 |
| Peeling resistance | 70 | 80 | 92 | 100 | 100 | 100 | 100 | 100 | 100 |
| Izod impact strength (−30° C.) (kgf · cm/cm) | 2.8 | 3.2 | 2.6 | 2.5 | 2.8 | 2.5 | 2.5 | 5.8 | 5.4 |
| Tensil strength (kgf/cm$^2$) | 363 | 324 | 389 | 411 | 424 | 432 | 394 | 284 | 292 |
| Elongation at break (%) | 3.2 | 3.3 | 3.2 | 3.3 | 3.1 | 3.0 | 3.0 | 4.8 | 3.9 |
| Bending modulus (kgf/cm$^2$) | 19,000 | 16,800 | 21,000 | 21,300 | 22,000 | 21,100 | 20,000 | 15,100 | 12,000 |
| HDT (°C.) | 99.8 | 96.7 | 100.3 | 100.8 | 101.4 | 96.5 | 98.3 | 96.0 | 94.8 |

TABLE 5

| | Example | | | | | | | | | |
|---|---|---|---|---|---|---|---|---|---|---|
| | 20 | 21 | 22 | 23 | 24 | 25 | 26 | 27 | 28 | 29 |
| Component, parts by weight | | | | | | | | | | |
| (A) PP | | 55 | 55 | 50 | 50 | 50 | 60 | 55 | 55 | | 60 |

TABLE 5-continued

|  |  | Example | | | | | | | | | |
|---|---|---|---|---|---|---|---|---|---|---|---|
|  |  | 20 | 21 | 22 | 23 | 24 | 25 | 26 | 27 | 28 | 29 |
|  | EPC |  |  |  |  |  |  |  |  | 55 |  |
|  | MAH-PP | 10 | 10 | 10 | 10 | 10 |  |  | 10 | 10 |  |
|  | MAH-PPDM |  |  |  |  |  | 5 | 10 |  |  | 5 |
| (B) | AS-1 | 25 | 27.5 | 25 | 25 | 25 | 25 | 20 | 25 | 25 |  |
|  | ABS |  |  |  |  |  |  |  |  |  | 28 |
|  | GMA-AS-1 | 5 | 5 | 10 |  |  | 5 |  |  |  |  |
|  | GMA-AS-2 |  |  |  | 10 |  |  | 5 |  |  | 5 |
|  | GMA-AS-3 |  |  |  |  | 10 |  |  | 2.5 | 5 |  |
| (C) | Ny-6 | 5 | 2.5 | 5 | 5 | 5 | 5 |  | 5 | 5 | 2 |
|  | PBT-1 |  |  |  |  |  |  | 10 |  |  |  |
| Optional component GMA-PMMA |  |  |  |  |  |  |  |  | 2.5 |  |  |
| Properties |  |  |  |  |  |  |  |  |  |  |  |
| MFR (g/10 min.) |  | 6.0 | 6.2 | 5.8 | 6.8 | 12.0 | 5.2 | 6.2 | 10.0 | 10.3 | 10.1 |
| Peeling resistance |  | 100 | 95 | 100 | 100 | 100 | 100 | 97 | 90 | 96 | 100 |
| Izod impact strength ($-30°$ C.) |  | 1.8 | 1.9 | 1.8 | 1.9 | 1.6 | 1.8 | 1.6 | 1.5 | 5.5 | 7.1 |
| (kgf · cm/cm) |  |  |  |  |  |  |  |  |  |  |  |
| Tensil strength (kgf/cm$^2$) |  | 442 | 443 | 448 | 444 | 438 | 430 | 418 | 405 | 367 | 286 |
| Elongation at break (%) |  | 4.4 | 4.6 | 4.9 | 5.2 | 4.8 | 4.4 | 6.4 | 5.0 | 5.1 | 7.3 |
| Bending modulus (kgf/cm$^2$) |  | 23,400 | 22,800 | 24,100 | 23,900 | 23,100 | 23,200 | 21,600 | 23,000 | 18,400 | 12,300 |
| HDT (°C.) |  | 105.8 | 105.9 | 106.3 | 105.9 | 98.3 | 105.7 | 104.1 | 98.6 | 96.8 | 95.3 |

TABLE 6

|  |  | Example | | |
|---|---|---|---|---|
|  |  | 30 | 31 | 32 |
| Component, parts by weight |  |  |  |  |
| (A) | PP | 50 | 50 | 55 |
|  | AXE-PP-A | 15 | 12.5 | 10 |
| (B) | AS-1 | 27.5 | 30 | 20 |
|  | ABS |  |  |  |
|  | GMA-AS-1 | 5 |  | 10 |
|  | GMA-AS-2 |  |  |  |
|  | GMA-AS-3 |  | 5 |  |
| (C) | Ny-6 | 2.5 | 2.5 |  |
|  | PBT-1 |  |  | 5 |
| Properties |  |  |  |  |
| MFR (g/10 min.) |  | 6.8 | 7.2 | 5.9 |
| Peeling resistance |  | 95 | 96 | 100 |
| Izod impact strength ($-30°$ C.) (kgf · cm/cm) |  | 1.7 | 1.6 | 1.8 |
| Tensil strength (kgf/cm$^2$) |  | 426 | 418 | 421 |
| Elongation at break (%) |  | 4.6 | 4.3 | 6.8 |
| Bending modulus (kgf/cm$^2$) |  | 22,800 | 22,000 | 22,200 |
| HDT (°C.) |  | 104.8 | 103.9 | 105.9 |

TABLE 7

|  |  | Comparison Example | | | | |
|---|---|---|---|---|---|---|
|  |  | 11 | 12 | 13 | 14 | 15 |
| Component, parts by weight |  |  |  |  |  |  |
| (A) | PP | 65 | 55 | 65 | 60 | 55 |
|  | EPC |  |  |  |  |  |
|  | MAH-PP |  | 10 |  | 5 |  |
|  | AXE-PP-A |  |  |  |  | 10 |
| (B) | AS-1 | 35 | 35 | 30 | 30 | 35 |
|  | ABS |  |  |  |  |  |
|  | GMA-AS-1 |  |  | 5 | 5 |  |
| (C) | Ny-6 |  |  |  |  |  |
|  | PBT-1 |  |  |  |  |  |
| Properties |  |  |  |  |  |  |
| MFR (g/10 min) |  | 16.0 | 18.4 | 16.3 | 9.4 | 15.8 |
| Peeling resistance |  | 0 | 0 | 0 | 48 | 0 |
| Izod impact strength ($-30°$ C.) (kgf · cm/cm) |  | 1.0 | 0.9 | 1.0 | 1.5 | 0.9 |
| Tensil strength (kgf/cm$^2$) |  | 389 | 323 | 391 | 410 | 378 |
| Elongation at break (%) |  | 3.7 | 3.6 | 3.7 | 4.2 | 3.5 |
| Bending modulus (kgf/cm$^2$) |  | 20,300 | 19,700 | 20,200 | 21,000 | 20,800 |
| HDT (°C.) |  | 100.3 | 99.8 | 100.3 | 104.6 | 100.1 |

Examples 33 to 39 and Comparison Examples 16 to 20

Components used were mixed at room temperature with a Henschel mixer in the amounts as indicated in Tables 8 and 9 (% by weight), followed by kneading at 250° C. and 200 rpm. with a 45 mm twin screws extruder and then cooling extrudates rapidly in water to obtain pellets of the thermoplastic resin compositions.

MFR, peeling resistance, Izod impact strength (at $-30°$ C.), tensil strength, elongation at break, bending modulus and heat distortion temperature (HDT) were determined on the resin compositions obtained. The results are summarized in Tables 8 and 9.

TABLE 8

|  |  | Example | | | | | | |
|---|---|---|---|---|---|---|---|---|
|  |  | 33 | 34 | 35 | 36 | 37 | 38 | 39 |
| Component parts by weight |  |  |  |  |  |  |  |  |
| (A) | PP | 60 | 45 | 55 | 40 | 50 |  | 50 |
|  | EPC |  |  |  |  |  | 45 |  |
|  | MAH-PP | 5 | 15 | 7 | 15 | 10 | 10 | 10 |
| (B) | AS-1 | 20 | 20 | 20 | 20 | 27.5 | 30 |  |
|  | ABS |  |  |  |  |  |  | 28 |
|  | GMA-AS-1 |  | 10 | 10 |  |  | 5 |  |
|  | GMA-AS-2 | 5 |  |  |  | 5 |  | 5 |
|  | GMA-AS-3 |  |  |  | 10 |  |  |  |
| (C) | Ny-6 | 5 | 5 | 5 |  | 2.5 | 5 | 2 |

TABLE 8-continued

| | Example | | | | | | |
|---|---|---|---|---|---|---|---|
| | 33 | 34 | 35 | 36 | 37 | 38 | 39 |
| PBT-1 | | | | 10 | | | |
| Optional Component EGMA | 5 | 5 | 3 | 5 | 5 | 5 | 5 |
| Properties | | | | | | | |
| MFR (g/10 min.) | 3.8 | 5.4 | 4.4 | 3.9 | 5.1 | 9.8 | 9.6 |
| Peeling resistance | 95 | 100 | 95 | 100 | 95 | 100 | 100 |
| Izod impact strength (−30° C.) (kgf · cm/cm) | 2.0 | 2.1 | 1.9 | 1.7 | 2.1 | 5.9 | 7.3 |
| Tensil strength (kgf/cm$^2$) | 428 | 434 | 430 | 408 | 428 | 348 | 258 |
| Elongation at break (%) | 3.9 | 4.2 | 4.6 | 5.3 | 4.8 | 6.0 | 7.4 |
| Bending modulus (kgf/cm$^2$) | 20,800 | 21,100 | 22,300 | 20,900 | 20,600 | 17,000 | 12,300 |
| HDT (°C.) | 101.7 | 101.6 | 103.6 | 101.1 | 101.6 | 97.0 | 96.1 |

TABLE 9

| | Comparison Example | | | | |
|---|---|---|---|---|---|
| | 16 | 17 | 18 | 19 | 20 |
| Component, parts by weight | | | | | |
| (A) PP | 65 | 55 | 65 | 60 | 60 |
| MAH-PP | | 10 | | 5 | |
| (B) AS-1 | 35 | 35 | 30 | 30 | 30 |
| GMA-AS-1 | | | 5 | 5 | 5 |
| (C) Ny-6 | | | | | |
| PBT-2 | | | | | |
| Optional Component EGMA | | | | | 5 |
| Properties | | | | | |
| MFR (g/10 min) | 16.0 | 18.4 | 16.3 | 9.4 | 8.3 |
| Peeling resistance | 0 | 0 | 0 | 50 | 0 |
| Izod impact strength (−30° C.) (kgf · cm/cm) | 1.0 | 0.9 | 1.0 | 1.5 | 3.0 |
| Tensil strength (kgf/cm$^2$) | 389 | 323 | 391 | 410 | 301 |
| Elongation at break (%) | 3.7 | 3.6 | 3.7 | 4.2 | 3.6 |
| Bending modulus (kgf/cm$^2$) | 20,300 | 19,700 | 20,200 | 21,000 | 18,600 |
| HDT (°C.) | 100.3 | 99.8 | 100.3 | 104.6 | 98.4 |

Additional Examples

Components used were mixed at room temperature with a Henschel mixer in the amounts as indicated in Table 10 (% by weight), followed by kneading at 250° C. and 200 rpm. with a 45 mm twin screws extruder and then cooling extrudates rapidly in water to obtain pellets of the thermoplastic resin compositions.

MFR, peeling resistance, Izod impact strength (at −30° C.), tensil strength, elongation at break, bending modulus and heat distortion temperature (HDT) were determined on the resin compositions obtained. The results are summarized in Table 10.

TABLE 10

| | Additional Example | | | | | | Comp. Ex. | |
|---|---|---|---|---|---|---|---|---|
| | 1 | 2 | 3 | 4 | 5 | 6 | 1 | 2 |
| Component, parts by weight | | | | | | | | |
| PP | 55 | 55 | 55 | 60 | 60 | — | 65 | 55 |
| EPC | — | — | — | — | — | 55 | — | — |
| AS-1 | 35 | 25 | 35 | 35 | — | 35 | 35 | 35 |
| AS-2 | — | — | — | — | 30 | — | — | — |
| AES-1 | 10 | 20 | — | — | 10 | 10 | — | — |
| AES-2 | — | — | 10 | 5 | — | — | — | — |
| ABS | — | — | — | — | — | — | — | 10 |
| Properties | | | | | | | | |
| MFR (g/10 min.) | 10.3 | 7.8 | 13.0 | 11.5 | 19.3 | 9.8 | 16.0 | 11.0 |
| Peeling resistance | 97 | 100 | 97 | 84 | 100 | 97 | 0 | 4 |
| Izod impact strength (−30° C.) (kgf · cm/cm) | 3.0 | 4.1 | 2.9 | 2.1 | 2.8 | 6.2 | 1.0 | 2.6 |
| Tensil strength (kgf/cm$^2$) | 423 | 402 | 432 | 447 | 398 | 254 | 389 | 341 |
| Elongation at break (%) | 11.0 | 13.0 | 10.8 | 6.3 | 12.0 | 14.1 | 3.7 | 3.0 |
| Bending modulus (kgf/cm$^2$) | 20,100 | 17,800 | 21,000 | 21,100 | 19,000 | 12,300 | 20,300 | 20,300 |
| HDT (°C.) | 99.8 | 98.8 | 100.4 | 103.4 | 100.5 | 97.2 | 100.3 | 100.1 |

We claim:

1. A thermoplastic resin composition comprising (A) 5 to 95 parts by weight of an olefinic resin, at least a part of which is modified with a glycidyl compound represented by the following formula:

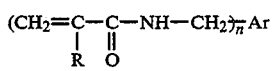

wherein R represents a hydrogen atom or an alkyl group having 1 to 6 carbon atoms, Ar represents a C$_{6-20}$ aromatic hydrocarbon radical which has at least one glycidyloxy substituent and may have other substituents, and n represents an integer of 1 to 4, (B) 95 to 5 parts by weight of an acrylonitrile-styrenic copolymer, at least a part of which is an acrylonitrile-styrenic copolymer modified with an epoxy compound, and (C) 0.5 to 100 parts by weight of at least one polymer selected from the group consisting of polyamides and polyesters, the total of (A) and (B) being 100 parts by weight.

2. The thermoplastic resin composition as claimed in claim 1, in which at least 10% by weight of the olefinic resin (A) is the modified olefinic resin.

3. The thermoplastic resin composition as claimed in claim 1, in which at least 1% by weight of the acrylonitrile-styrenic copolymer (B) is the epoxy-modified acrylonitrile-styrenic copolymer.

4. The thermoplastic resin composition as claimed in claim 1, in which the acrylonitrile-styrenic copolymer (B) is an acrylonitrile-styrene copolymer or an acrylonitrile-butadiene-styrene copolymer.

5. The thermoplastic resin composition as claimed in claim 1, in which the acrylonitrile-styrenic copolymer is modified with glycidyl methacrylate.

6. The thermoplastic resin composition as claimed in claim 1, in which the olefinic resin (A) is polypropylene or a propylene copolymer.

* * * * *